United States Patent [19]

Klein et al.

[11] Patent Number: 5,692,764

[45] Date of Patent: Dec. 2, 1997

[54] BICYCLE FRONT FORKS AND METHODS OF MAKING SAME

[75] Inventors: Gary G. Klein; Darrell W. Voss; Richard W. Randall, all of Chehalis, Wash.

[73] Assignee: Klein Bicycle Corporation, Chehalis, Wash.

[21] Appl. No.: 105,576

[22] Filed: Aug. 13, 1993

[51] Int. Cl.[6] .................................................. B62K 21/02
[52] U.S. Cl. ...................... 280/279; 280/280; 280/281.1
[58] Field of Search ................................. 280/280, 279, 280/278, 281.1, 288; 264/258

[56] References Cited

U.S. PATENT DOCUMENTS

| 558,545 | 4/1896 | Ziegler | 280/288 |
|---|---|---|---|
| 571,941 | 11/1896 | Bolte | 280/288 |
| 4,373,741 | 2/1983 | Resele | 280/279 |
| 4,900,050 | 2/1990 | Bishop et al. | 280/281.1 |
| 4,993,735 | 2/1991 | Chen | 280/281.1 |
| 5,016,895 | 5/1991 | Hollingsworth et al. | 280/280 |
| 5,078,417 | 1/1992 | Mouritsen | 280/280 |
| 5,181,732 | 1/1993 | Bezin et al. | 280/281.1 |

*Primary Examiner*—Anne Marie Boehler
*Attorney, Agent, or Firm*—Jim Zegeer, Esq.

[57] ABSTRACT

The invention disclosed herein is a very durable, lightweight, front fork assembly for use on competition bicycles. The invention provides improved fatigue and impact resistance compared to prior art designs. The invention makes maximum use of advanced, high strength composite materials and high strength, lightweight metal alloys, improving its stiffness-to-weight and strength-to-weight ratios. The superior structural performance of the invention is provided by a unique section geometry and ply configuration that efficiently utilizes the material to maximize bending and torsional stiffness while minimizing weight. The improved strength also comes from the superior control of the molding process, made possible with a removable pressure bladder that remains connected to the pressure source, and is regulated, during the molding process. The invention is produced using an efficient, "cigar" roll-up procedure where the fiber lay-up is first made in a flat pattern and later rolled up into the final "cigar" roll-up configuration.

40 Claims, 11 Drawing Sheets

SECTION A-A DETAIL

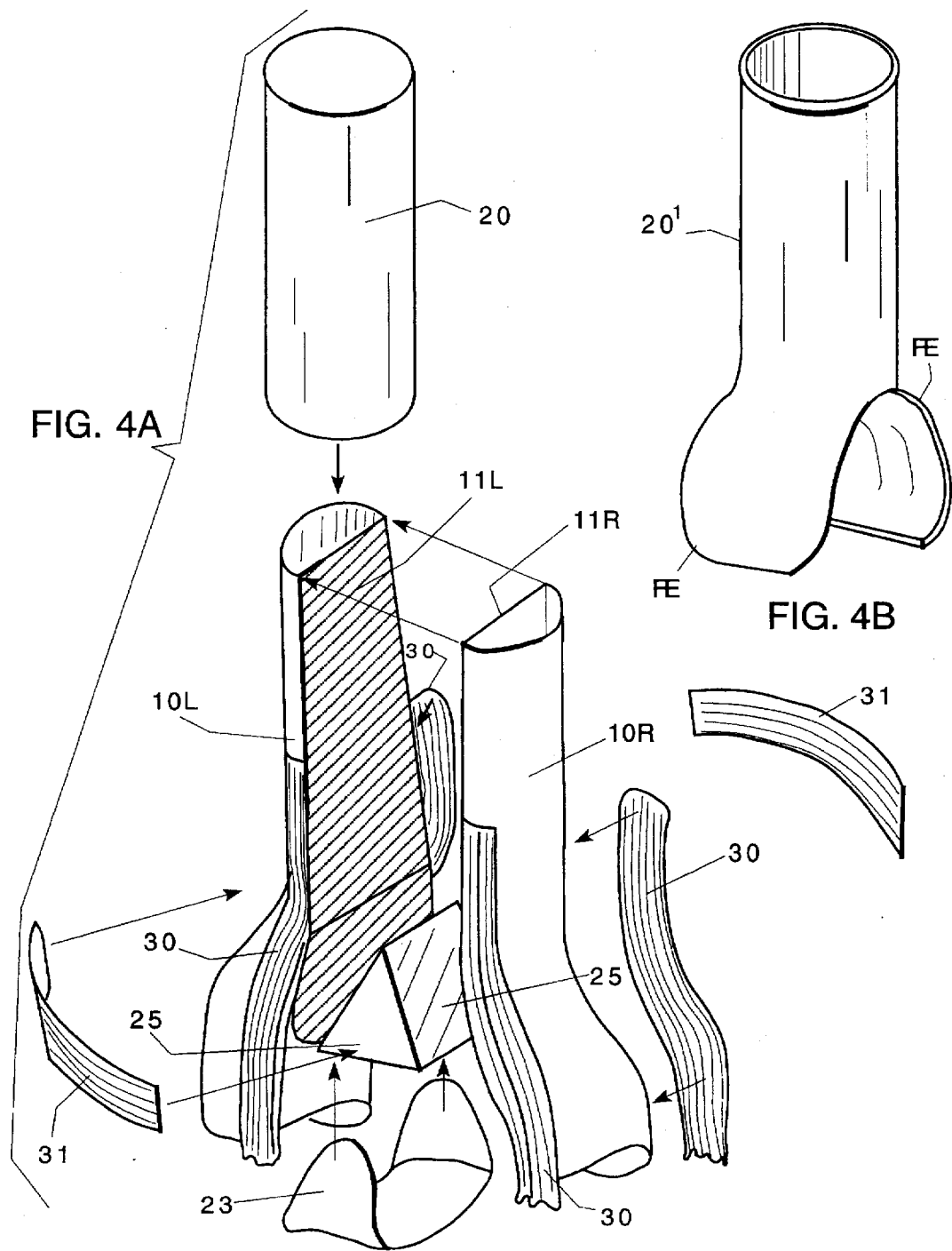

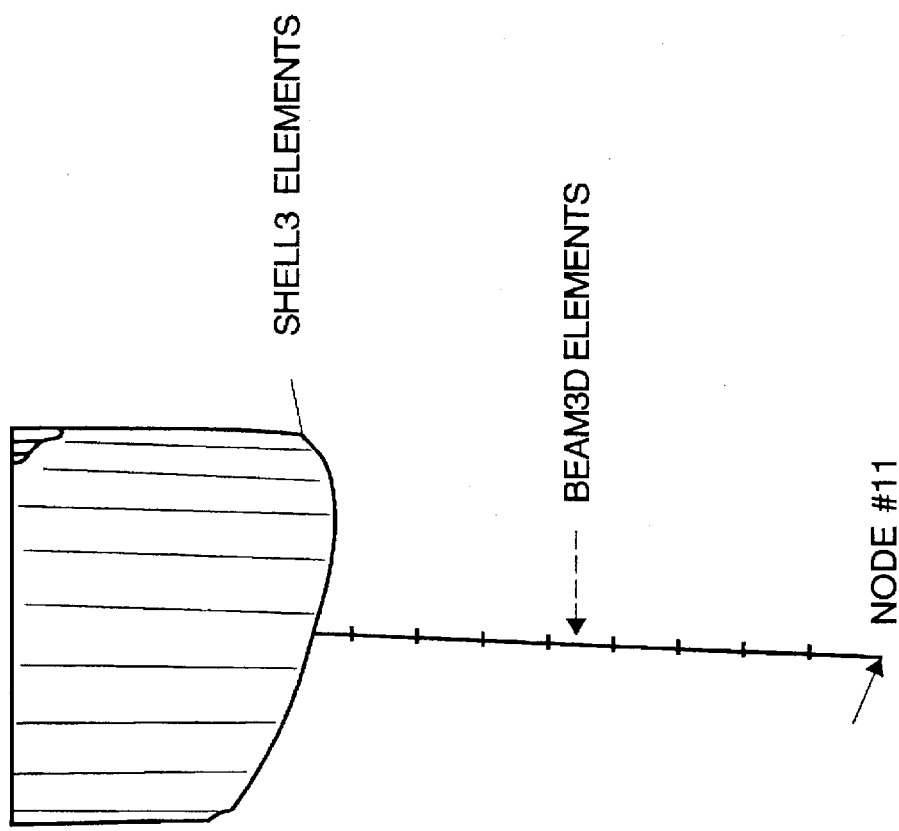
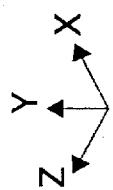
FIGURE 10

BICYCLE FRONT FORKS AND METHODS OF MAKING SAME

INTRODUCTION

This invention is directed to improved bicycle front forks and improved methods of creating steerable front forks of a bicycle, particularly for competition road or mountain bike use. The invention provides two shaped fork blades inserted directly into the fork steerer tube to achieve outstanding properties and economy of construction. Preferably the fork designs disclosed herein utilize a unique arrangement of metal and advanced composite materials and a unique method of assembling these materials to achieve a cost effective front fork structure with stiffness and strength properties far superior to prior art designs, at significantly reduced weight.

Composite bicycle forks (and bicycles) have been in production for some years now. See Foret U.S. Pat. No. 4,657,795; Foret, et al., U.S. Pat. No. 4,828,285; Begin, et al., U.S. Pat. No. 5,039,470; French Patent Pub. 2,546,473; Kuborwin, et al., U.S. Pat. No. 5,122,210; Mouritsen, U.S. Pat. No. 5,078,417. Although composite materials are among the most weight efficient structural materials available today, these current production designs (discussed later herein) do not demonstrate superior weight advantages over today's leading metal fork designs. This indicates that the current composite designs are not taking full advantage of the structural capability of these advanced materials. In this invention several preferred embodiments of optimized fork designs are disclosed. These embodiments use optimally shaped section geometries and optimally arranged fiber ply configurations to make maximum use of the weight, stiffness and strength characteristics of the advanced composite materials available today. The disclosed embodiments demonstrate significantly higher stiffness and strength properties, at a reduced weight, compared to leading competition fork designs available on the market today.

This invention not only embraces the fork embodiments disclosed herein but also a preferred manufacturing process allowing these embodiments to be produced cost effectively.

BACKGROUND

A key part of a bicycle is the front fork assembly. The front fork assembly serves several important design functions. First, it provides the necessary structure and attaching hardware for mounting the front wheel and brake assemblies. Second, it allows directional (steering) control of the front wheel assembly, by its mounting in the headset bearings and its direct attachment to the handle-bar assembly. Third, it serves as a key structural member in reacting the road and impact loads imparted to the front wheel through steering, overcoming obstacles, sprinting and hard braking.

PRIOR ART FRONT FORK DESIGN

From a functionality point of view, the front fork assembly for mountain and road bicycles are quite similar. FIG. 1 illustrates a typical fork assembly. The assembly consists of a steerer (1), the fork crown (2), two fork blades (3L and 3R) and a pair of front axle dropout attachments (4L and 4R). The steerer (1) is a circular tube section with precision machined areas to provide the bearing seats for the upper (5) and lower (6) headset bearings. For the majority of use, the steerer tube is threaded at (7) and the fork held in place by a retainer nut. For some more recent applications of bicycles, the upper bearing is held in place with a split collet assembly, tightened from the top with a small screw. For bicycles with oversized steerers, the top bearing (6) has a press fit and the fork assembly is held in place by the press fit and an adhesive bond (see Klein U.S. Pat. No. 5,002,297).

The crown of the fork (2) is the transition region of the structure connecting the steerer with the fork blades. This region of the structure carries the bulk of the bending and torsional loads of the structure and, therefore, must be designed accordingly. The stress field in this region is bi-axial, with stress components from both bending and torsion imposed by the steerer and the fork blades. This area of the structure also plays a key role in the torsional and bending rigidity of the structure. Several different designs have been used for the fork crown. One design uses a separate part for the crown with the steerer and blades joined by welding, brazing or bonding. Other designs use a bent blade, where the blade terminates at the steerer tube, by a weld or braze, and the crown is actually the bent portion of the blade.

The fork blades (3L and 3R) are hollow, circular or non-circular (aerodynamic) shaped structural tubing connecting the dropout attachments (4L and 4R) to the upper part of the fork structure. This portion of the fork assembly is also important to the overall bending and torsional rigidity and strength of the fork structure.

The dropout attachments (4L and 4R) of the fork assembly are solid attachments, usually machined, cast or forged parts (stamped steel in less expensive bicycles). These parts serve as the attachment point for the front axle and are attached to the blades by welding, brazing or adhesive bonding.

Another functional interface for the front fork design is the front brake system. Typically, for road bikes a single brake mounting hole (8) is located in the region of the fork crown to support the brake calipers. The support is usually bored through the fork steerer allowing the installation of a stud for mounting the brake calipers. Mountain bicycles, with their more demanding braking requirements, generally use two brake caliper supports (9L and 9R). These supports are located on the fork blades. The fork structure in the immediate vicinity of these supports must be able to withstand the shear and bending stresses imposed by the braking function.

The above basic requirements for a front fork assembly design have a direct bearing on the overall geometry of the fork. If the fork is to be compatible with standard tire, hub, rim and brake designs, then certain limitations are required on the overall fork geometry. However, within these restrictions the section may be optimized for stiffness, strength and weight.

Typical weights and strength characteristics of prior art front fork designs are summarized by the following:

ROAD FORK DATA

| Fork Type Strength (lbf) | Wt. | Lng. Stiffn. (gm) | Lat. Stiffn. (lbf/in) | Lng. (lbf/in) |
|---|---|---|---|---|
| Carbon Fiber: | | | | |
| Kestrel EMS | 576 | 420 | 270 | 530 |
| Trek C/Ep | 569 | 330 | 230 | 600 |
| Look Carbofork | 466 | 310 | 190 | 380 |

-continued

| Fork Type Strength (lbf) | Wt. | Lng. Stiffn. (gm) | Lat. Stiffn. (lbf/in) | Lng. (lbf/in) |
|---|---|---|---|---|
| Aluminium: | | | | |
| Prologue | 590 | 325 | — | 610 |
| SR Prism | 614 | 300 | 310 | 495 |
| Vitus | 548 | — | — | — |
| Nikko | 526 | — | — | — |
| Tange Fusion | 526 | 360 | — | 480 |
| Steel: | | | | |
| Spinner SPT | 715 | 380 | — | 520 |
| Quantum | 740 | 320 | — | 600 |
| Spinner Unicrown | 740 | — | — | — |

MOUNTAIN BIKE DATA

| Fork Type Strength (lbf) | Wt. | Lng. Stiffn. (gm) | Lat. Stiffn. (lbf/in) | Lng. (lbf/in) |
|---|---|---|---|---|
| Carbon/Aluminum: | | | | |
| Klein Adroit | 539 | — | — | — |
| Aluminum: | | | | |
| Klein Attitude | 608 | 460 | — | 800 |
| Cannondale Pepperoni | 822 | — | — | — |
| Steel: | | | | |
| Spinner | 795 | 380 | — | 610 |
| Yeti | 928 | — | — | — |
| Project Two | 1002 | — | — | — |
| Koski | 946 | — | — | — |
| Klein Pinnacle | 805 | 800 | — | — |
| Tioga Avenger | 843 | — | — | — |
| Bontrager | 1046 | — | — | — |
| IRD | 1066 | — | — | — |
| Tange Switchblade | 1137 | — | — | — |

STRUCTURAL DESIGN CONSIDERATIONS FOR HIGH PERFORMANCE BICYCLE FORKS

The critical loading scenario for the front fork structure is a frontal impact or panic braking. These two loading cases introduce a horizontal load component applied at the front axle attachment. This introduces a maximum bending and torsional loading in the crown area of the structure. Other loading scenarios can be envisioned (e.g., vertical impact, bullwinkle, side-rim, handle-bar torsion, etc.), however, past experience shows that the frontal impact and panic braking cases generally control the design.

Structural failures of bicycle fork assemblies may be divided into two groups. One group involves fatigue type failures resulting from a long term exposure of the structure to the loading environment. The other group involves yield (or buckling) type failures resulting from excessive local straining of the structural material. Both types of failures are of concern to the bicycle designer since both can occur in the real world environment.

FATIGUE FAILURES

Several structural areas of the fork assembly are susceptible to fatigue cracking. Probably the area most susceptible are the welds in the fork crown. This is due to, a) the concentrated nature of the stresses in this region, b) the relatively large stress risers associated with the weld and c) the reduced material properties in the heat effected zone of the weld. Other parts in the fork structure susceptible to fatigue cracking include the bearing area in the vicinity of the lower head-set bearing, the structure supporting the brake bosses (FIG. 1—8, 9L, and 9R) and the dropout lug attachments (FIG. 1—4L and 4R).

Composite materials have some distinct advantages over metals in fatigue. First, the yield allowables of the composite materials are usually considerably higher than the metal alloys commonly used for bicycle front forks. Second, because of the distinct fiber plies and fiber orientations in a laminate, the structure has the ability to "bridge" damaged areas and continue to carry load following a localized failure. Crack propagation does not occur as easily in a composite laminate as it does in a metal structure. Also, since there are no "heat-effected" zones in a composite structure (no welds) the material properties of the fiber and matrix material are relatively constant over the entire structure. However, there are some localized factors, unique to composites, that can adversely effect the performance of the overall structure.

Fiber micro-buckling and kinking, shear crippling, interlaminar shear and ply delaminations are not failure modes of concern in the design of metal structures. However, in composite laminates these are real occurrences and must be adequately addressed in the design of the structure. In the vicinity of concentrated loads, extreme care must be taken in the design of the laminate. These concentrated loads generally occur near joints, lugs or other areas of the structure where abrupt changes in the direction of the load paths occur. These areas basically include all of the areas previously discussed for the metal fork structure (i.e., crown, contact area for the lower head-set bearing, brake bosses, and dropout lugs). These areas of the structure should be designed so that the primary load carrying fibers are as directly aligned with the load as possible and other fiber orientations are needed to control structural deformation and to hold the primary load fibers in position, keeping them from buckling or delaminating. As a result, the optimum composite laminate is nearly quasi-isotropic (nearly uniform properties in all directions).

IMPACT RESISTANCE

Competition bicycle forks experience occasional tire impacts that are quite severe. These impact loads do not occur frequently enough to be considered fatigue loads but, nevertheless, are a threat to the life of the fork structure. The fork structure must be designed with adequate load carrying capacity to handle these loads without yielding or buckling the fork structure.

DETAILED DESCRIPTION OF INVENTION

The above and other objects, advantages, and features of the invention will become more apparent when considered with the following specification and accompanying drawings wherein.

Figure 3A:
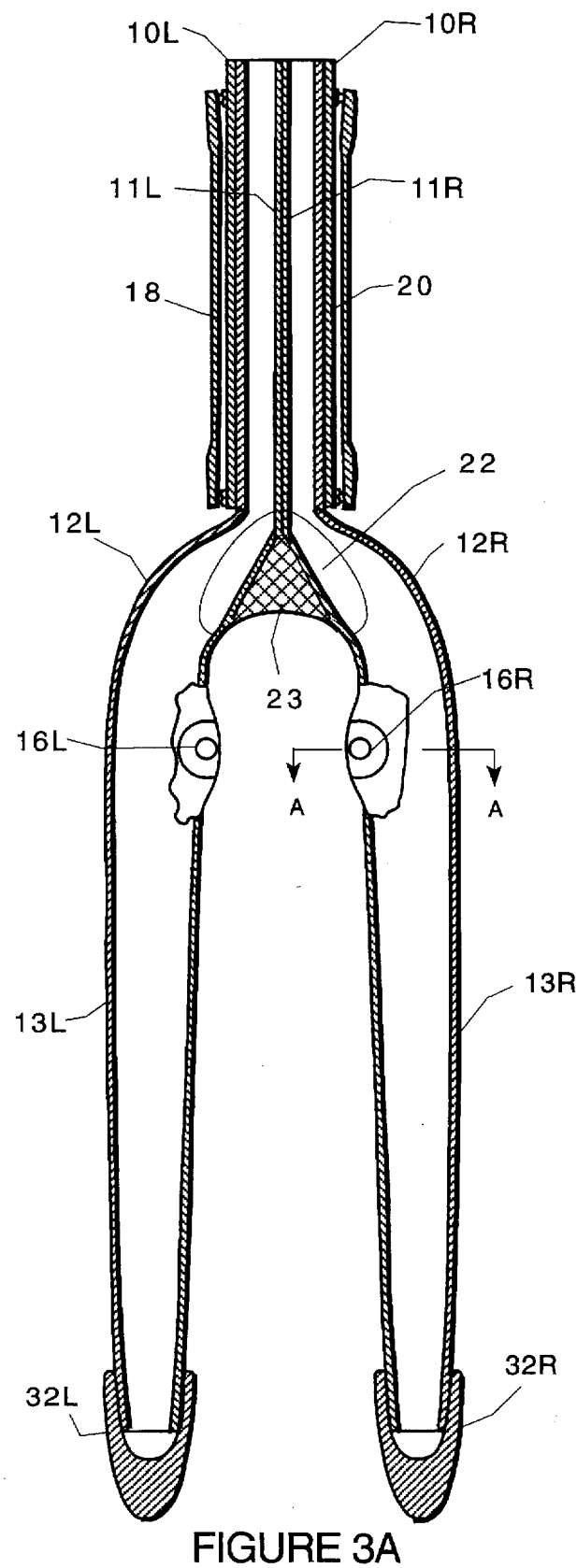
FIG. 3A illustrates an embodiment for mountain bicycles.
Figure 3D:
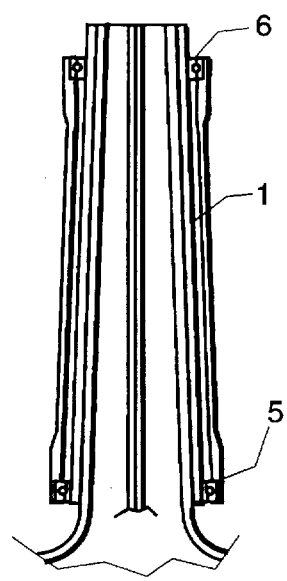
Figure 3B:
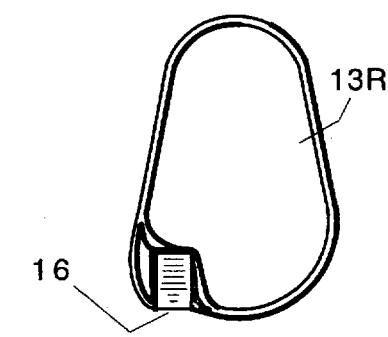
Figure 3C:
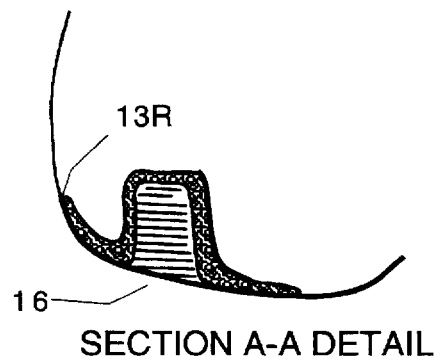
Figure 5A:
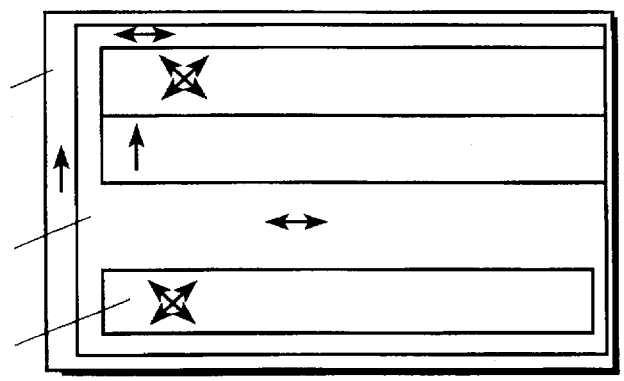
Figure 5B:
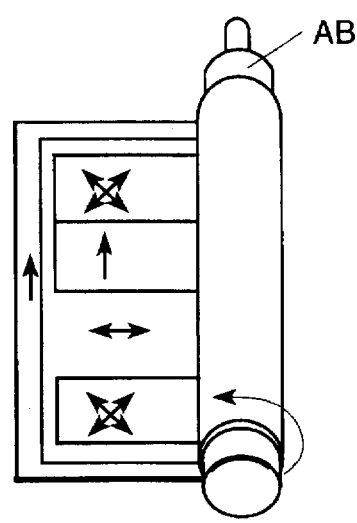
Figure 5C:
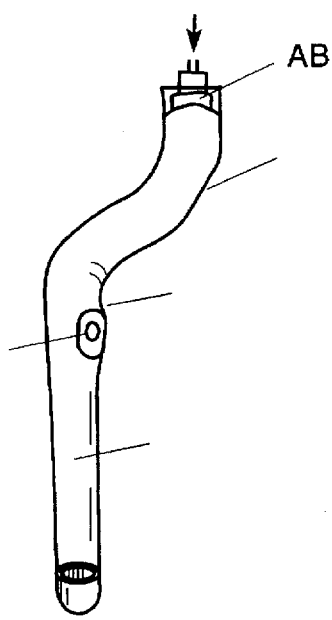
Figure 5D:
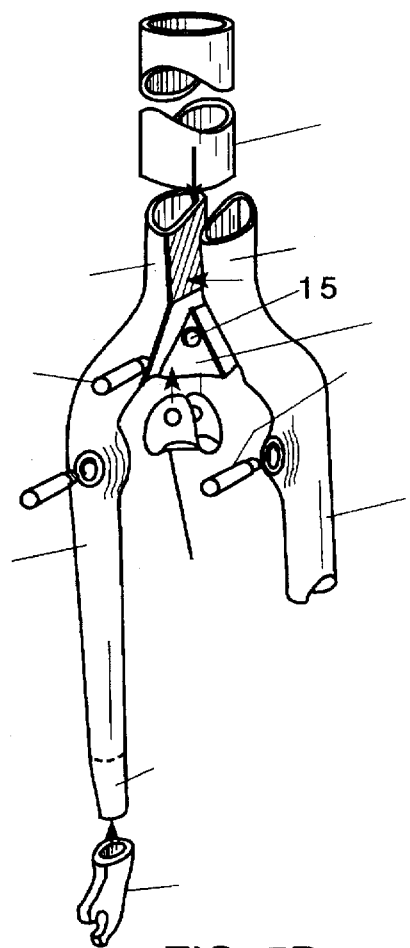
Figure 6:
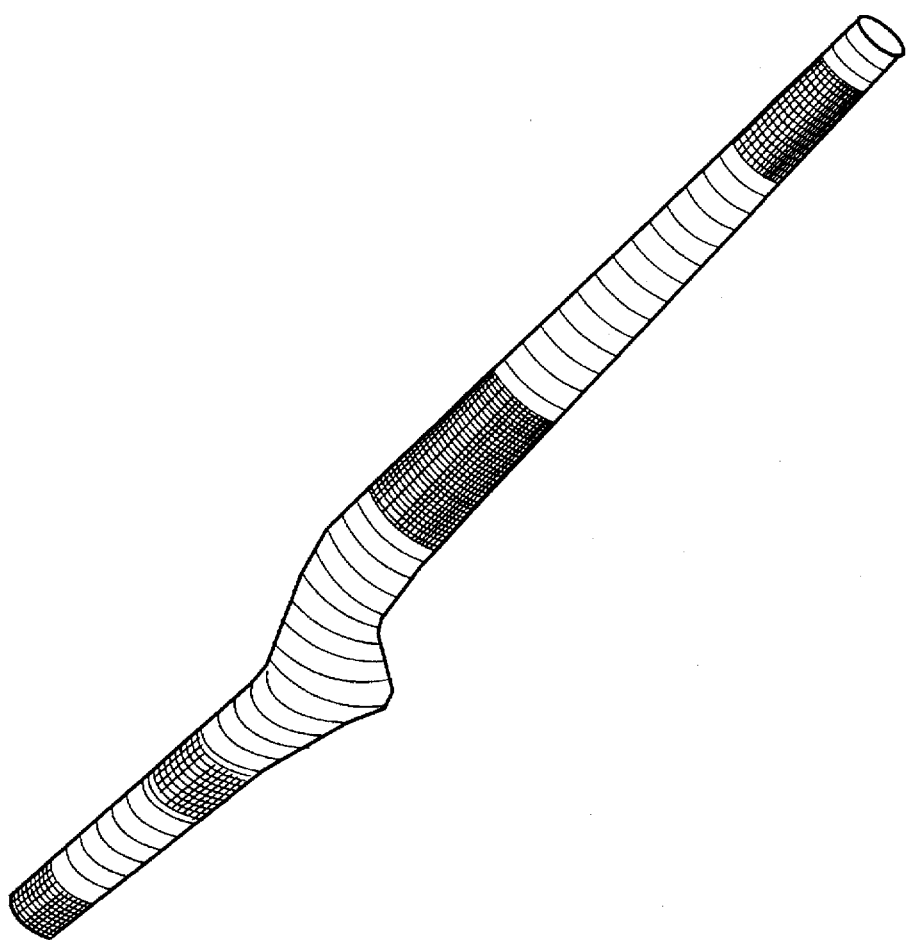
Figure 7:
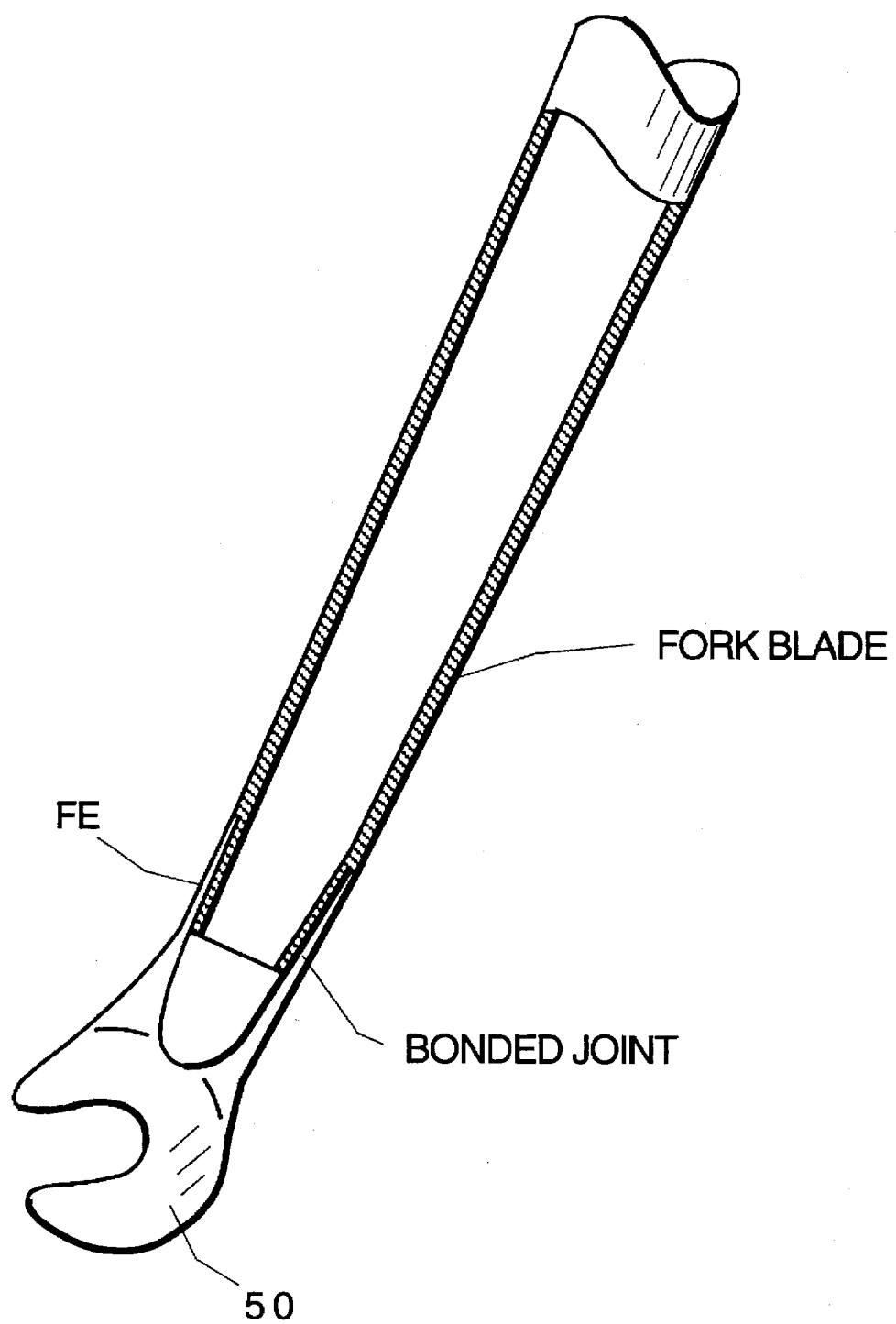
Figure 8:
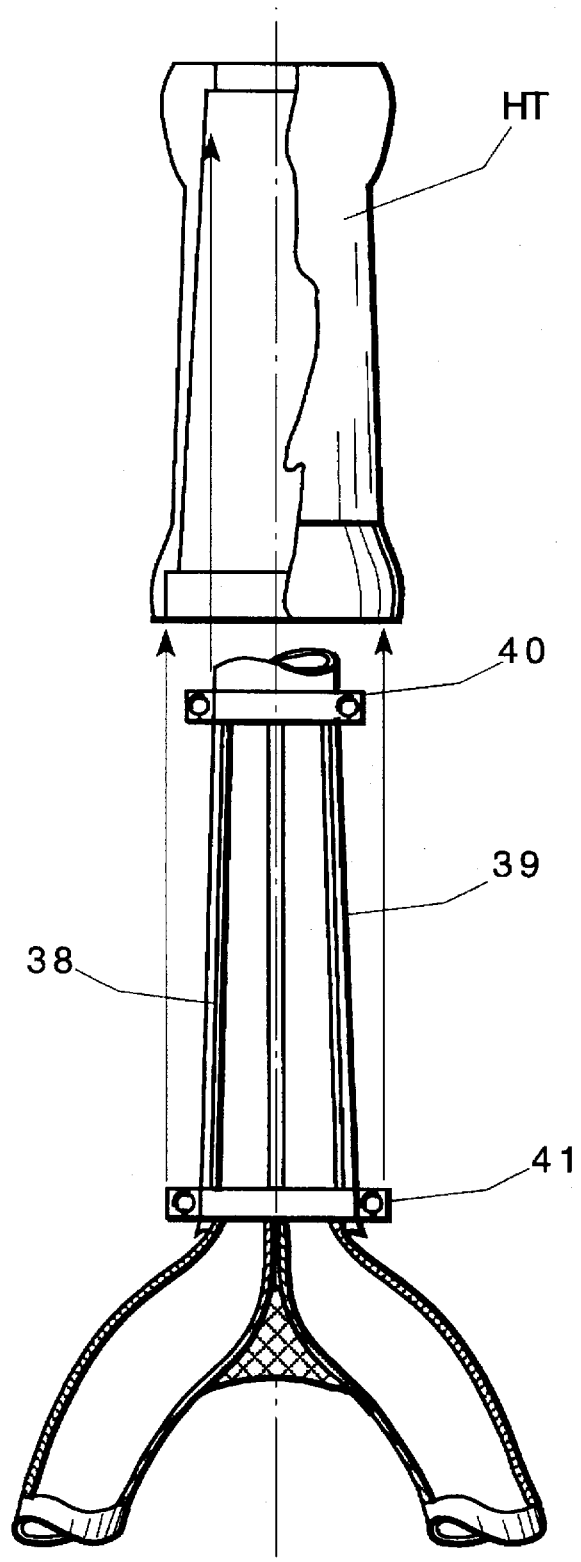
Figure 9:
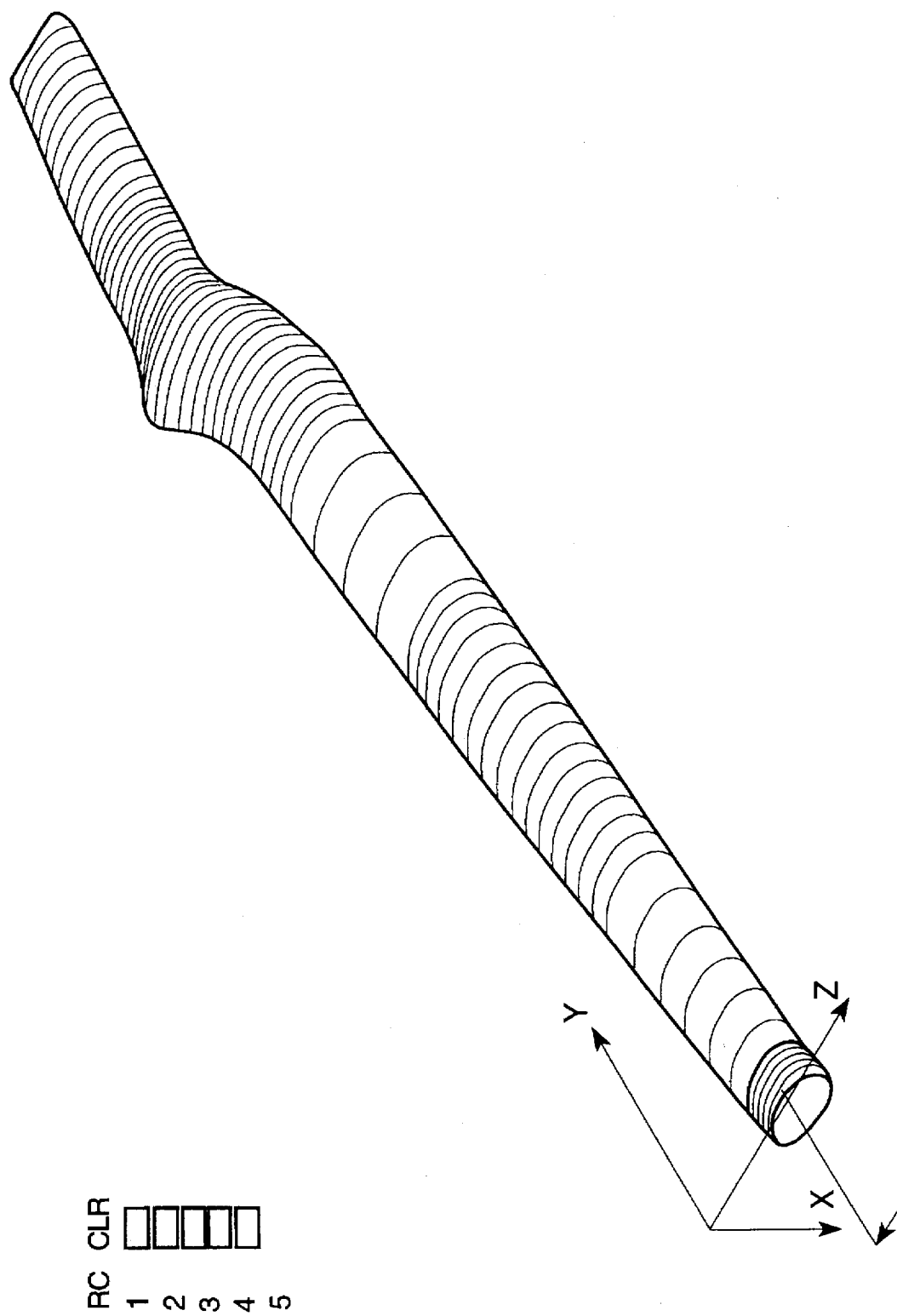
Figure 11:
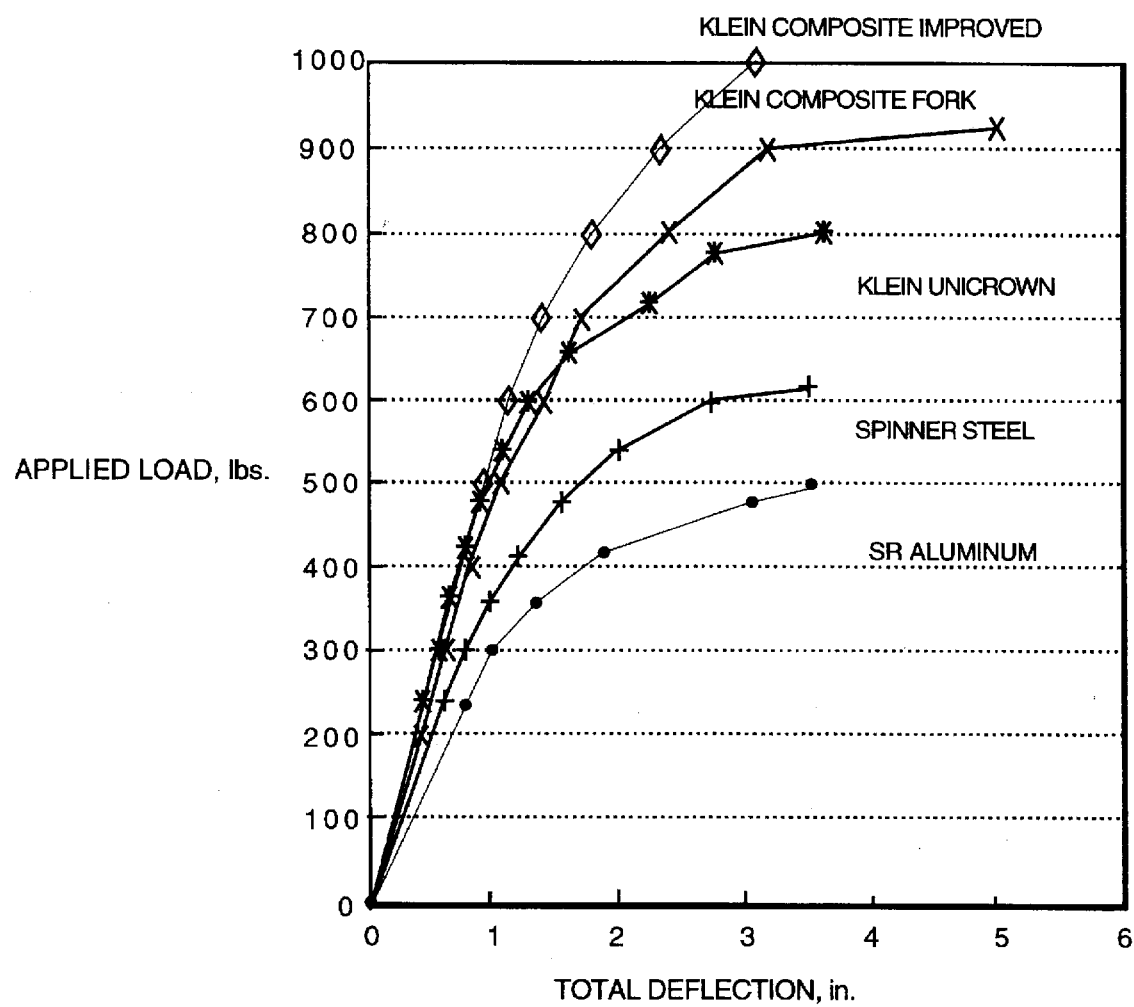

FIG. 3B is a sectional view on lines B—B, FIG. 3C is an enlargement showing a threaded metal insert, and FIG. 3D illustrates an optional modification of the steerer portion, FIG. 4A is an exploded view of the steerer section of a fork incorporating the invention, and FIG. 4B is an optional modification of the sleeve extension, FIG. 5A illustrates step 1, fiber lay up in the manufacturing processes, FIG. 5B illustrates step 2 "cigar" roll-up of the fiber lay-up of FIG. 5A with an air bladder inserted after roll-up, FIG. 5C diagrammatically illustrates the step 3 of the molding operation, FIG. 5D diagrammatically illustrates the final assembly, FIG. 6 shows the stresses in various areas and correlates same with the layout tables disclosed later herein, FIG. 7 illustrates installation of the drop-out to the lower ends of the blades (only one shown), FIG. 8 illustrates a preferred novel fork steerer/head tube connection embodiment, FIGS. 9 and 10 illustrate the model used for evaluating the fork of the present invention, and FIG. 11 is a graph plotting the load applied to various fork designs including novel forks of this invention.

DETAILED DESCRIPTION OF THE INVENTION

High performance bicycle forks require both high strength and stiffness at a minimum weight (high strength-to-weight and stiffness-to-weight ratios). This invention incorporates the following features:

1. The use of unique, optimized sections (including the overall geometry of the part) to carry the working loads in the most efficient way possible.
2. Improved joining techniques that allow higher strength metal alloys, composite materials and combinations of these materials to be used more effectively.
3. Use of composite materials with minimum resin content and minimum number of voids (improved fiber compaction) resulting in road and mountain bike forks which are approximately ⅔ or less the weight of prior art forks.
4. Use of special bearing assemblies and bearing contact geometries to minimize localized contact stresses.
5. Use of fiber ply geometries that utilize the strength and stiffness properties of modern composite materials to achieve superior strength-to-weight and stiffness-to-weight ratios.

Forks incorporating the present invention have been evaluated against several leading bicycle fork designs currently on the market. This evaluation was made using an advanced, state-of-the-art finite element computer modeling system. The results of this study are presented later herein in support of this invention.

This invention includes two composite (or metallic) front fork designs, one design for road bicycles and another for mountain bicycles. FIG. 3 illustrates the fork design for road bicycles and FIG. 4 the design for mountain bicycles. Both designs consist of two halves joined together to form the full assembly. Preferably, mechanical locking and adhesive bonding methods are used to join the two halves. Each half includes steerer portions (10L, 10R) (preferably oversized), a steerer web (11L, 11R), a crown (12L, 12R), a blade (13L, 13R), and a dropout lug (14L, 14R). While webs 11L and 11R are shown as having flat congruent and abutting surfaces, they can have congruent complementary surface shapes other than flat to increase the surface area of congruency and better mechanically interlock the two halves. For road bicycles, a single brake caliper support hole 15 (FIG. 5D) is provided in the vicinity of the fork crown 12L, 12R. For mountain bicycles, two brake caliper supports (16L, 16R) are provided, in the upper area of the fork blades. The entire fork assembly is mounted in the bicycle frame head-tube (18) by two aircraft-type sealed torque tube bearings 7, 8 (as disclosed in Klein U.S. Pat. No. 5,002,297).

The two halves of the fork assembly are joined by bonding the steerer web surfaces (11L, 11R) together, as indicated in FIG. 5. A metal sleeve (20) is then slipped over the bonded steerer, and itself bonded into place. The metal sleeve 20 along with the composite (or formed metal) substrate provide the structure necessary for supporting the bearing reaction loads. The metal sleeve 20 also provides a hard, durable contact surface for reacting the bearing contact stresses and distributing these stresses to the composite (or metal) substrate.

A "diaper" reinforcement part 22 and/or a wedge block 23 are used to structurally reinforce the crown area of the fork assembly and, for the road bicycle design, help to support the brake caliper support stud 15 (FIG. 5D). The diaper reinforcement 23 is made from a metal or composite material and is bonded into place using a high strength structural adhesive. The wedge block 35 is preferably made from a composite material and is also bonded into place against substantially congruent complementary shaped surfaces as shown in FIG. 4A using a high strength structural adhesive. If the two halves are co-molded wedge 25 and diaper patch 23 would likewise be co-molded.

MANUFACTURING PROCESS

Included in this invention is a manufacturing process developed to produce the composite fork assemblies cost effectively. FIGS. 5A–5O illustrates the process. The process consists basically of four (4) steps. The steps are:

1. Fiber Lay-up (FIG. 5A)
2. "Cigar" Roll Up (FIG. 5B)
3. Molding Operations (FIG. 5C)
4. Final Assembly (FIG. 5D)

Step #1—Fiber Lay-up (FIG. 5A):

Step 1 of the process is the fiber lay-up phase. In this step the selected composite materials are cut to a pattern and stacked up to form the desired laminate configuration. The ply materials may be unidirection tape or single layer woven fabrics. Fiber materials may include glass, kevlar, carbon, boron and others or combinations of these, for each ply. Available matrix materials cover a range from polymers to metals to ceramics. Polymeric matrix composites are the most widely used. The fiber orientation for each ply provides yet another design alternative for the designer. As one can readily see, the design of the laminate is no small task. The design of the laminate is based on the loading requirements for the structure in question. Although a near optimum laminate design may be determined by trial, advanced mathematical methods are available to assist the designer. These methods include the finite element analysis (FEA) method, a computer modeling technique widely used in industry today. This technique is discussed later.

Based on applicant's FEA modeling of a bicycle front fork assembly, several distinct areas of the fork structure falling into the categories of "highly stressed", "moderately stressed" and "low stress" have been identified. These areas are indicated in FIG. 7. These stress zones are used to help in the lay-up design of the laminate. The high stress areas occur in the fork crown, in the vicinity of the lower head-set bearing and at the attachment point for the dropout lug. In one embodiment of a fork incorporating the invention, these high stress areas were given the ply lay-up pattern described in Table 1. A carbon/epoxy material was used throughout the laminate. The total thickness of the laminate for the high stress zones was 0.0988". The ply lay-up configuration for the moderately stressed zones (see FIG. 6) is shown in Table 2. It should be noted that for the actual design of the fork structure, the stress zones are actually "blended" so that no abrupt stiffness change from one zone to another occurs.

The low stress zone (FIG. 6) is given the laminate lay-up configuration described in Table 3. This represents the thinnest part of the fork structure, with a laminate thickness of 0.0384". The ply geometries in Tables 1–3 were evaluated using an advanced finite element computer program. This study and the results that were obtained are discussed later.

Four additional pieces of unidirectional material are placed in the front and rear of each fork blade through the region of the fork crown (see Item No. 30, FIG. 5). These are a blend of carbon and boron fibers. These four pieces 30 are placed in the mold separately from the cigar, and are oriented to make an almost straight line through the fork crown region. These pieces combined with the unusual fork crown shape provide a direct load path and greatly reduce the delamination forces in the overall blade.

Also, two additional hoop pieces (see Item No. 31, FIG. 5) are provided to reinforce the wedge block and to counter any tendency for the wedge block bonded joints to fail from tension stresses (peeling action).

TABLE 1

Laminate Configuration, High Stress Region

| Layer No. | Material | No. Plies | Orientation | Layer Thick. |
|---|---|---|---|---|
| 16 (top) | Carbon (*) | 1 | 0-deg | .0054" |
| 15 | Carbon (*) | 1 | 0-deg | .0054" |
| 14 | Carbon (**) | 1 | 90-deg | .0054" |
| 13 | Carbon (*) | 1 | 0-deg | .0054" |
| 12 | Carbon (**) | 1 | 90-deg | .0054" |
| 11 | Carbon (*) | 1 | 0-deg | .0054" |
| 10 | Carbon (***) | 2 | +45-deg | .0084" |
| 9 | Carbon (***) | 2 | −45-deg | .0084" |
| 8 | Carbon (*) | 1 | 0-deg | .0054" |
| 7 | Carbon (**) | 1 | 90-deg | .0054" |
| 6 | Carbon (*) | 1 | 0-deg | .0054" |
| 5 | Carbon (**) | 1 | 90-deg | .0054" |
| 4 | Carbon (***) | 2 | −45-deg | .0084" |
| 3 | Carbon (***) | 2 | +45-deg | .0084" |
| 2 | Carbon (*) | 1 | 0-deg | .0054" |
| 1 (bot) | Carbon (**) | 1 | 90-deg | .0054" |
| | | | | .0988" |

Notes:
Carbon (*) = T300, Unidirectional, 0-deg Carbon Fiber
Carbon (**) = C-M40J-110/38 High Modulus Carbon Prepreg
Carbon (***) = CGG260, +/− Fabric

TABLE 2

Laminate Configuration, Moderate Stress Region

| Layer No. | Material | No. Plies | Orientation | Layer Thick. |
|---|---|---|---|---|
| 9 (top) | Carbon (*) | 1 | 0-deg | .0054" |
| 8 | Carbon (*) | 1 | 0-deg | .0054" |
| 7 | Carbon (***) | 1 | +45-deg | .0042" |
| 6 | Carbon (***) | 1 | −45-deg | .0042" |
| 5 | Carbon (**) | 1 | 90-deg | .0054 |
| 4 | Carbon (*) | 1 | 0-deg | .0054" |
| 3 | Carbon (***) | 1 | −45-deg | .0042" |
| 2 | Carbon (***) | 1 | +45-deg | .0042" |
| 1 (bot) | Carbon (**) | 1 | 90-deg | .0054" |
| | | | | .0438" |

Notes:
Carbon (*) = T300, Unidirectional, 0-deg Carbon Fiber
Carbon (**) = C-M40J-110/38 High Modulus Carbon Prepreg
Carbon (***) = CGG260, +/− Fabric

TABLE 3

Laminate Configuration, Low Stress Region

| Layer No. | Material | No. Plies | Orientation | Layer Thick. |
|---|---|---|---|---|
| 8 (top) | Carbon (*) | 1 | 0-deg | .0054" |
| 7 | Carbon (*) | 1 | 0-deg | .0054" |
| 6 | Carbon (***) | 1 | +45-deg | .0042" |
| 5 | Carbon (***) | 1 | −45-deg | .0042" |
| 4 | Carbon (*) | 1 | 0-deg | .0054" |
| 3 | Carbon (***) | 1 | −45-deg | .0042" |
| 2 | Carbon (***) | 1 | +45-deg | .0042" |
| 1 (bot) | Carbon (**) | 1 | 90-deg | .0054" |
| | | | | .0384" |

Notes:
Carbon (*) = T300, Unidirectional, 0-deg Carbon Fiber
Carbon (**) = C-M40J-110/38 High Modulus Carbon Prepreg
Carbon (***) = CGG260, +/− Fabric Step #2, "Cigar" Roll up:

In this production step, the laminate lay-up in Step #1 is rolled up (similar to a cigar) around a preferably hard mandrel (hard mandrel not shown in FIG. 6). This is done for each half of the fork structure. The laminate roll up now contains half of the fork structure. A flexible air bladder AB or a lightweight "pressure" bag is then inserted into the laminate roll prior to the molding operations in Step #3. This rolling step can also be performed with a flexible bladder on a solid mandrel inside the flexible bladder which is subsequently removed.

Step #3, Molding Operation:

The laminate roll in Step #2, along with the inflatable air bladder (or lightweight "pressure" bag), is inserted into a mold (only half of the mold cavity is shown in FIG. 5C). The inflatable bladder (and the lightweight "pressure" bag) are designed to operate at molding pressures of up to approximately 200 psig. The pressure containers are extremely flexible, allow the pressure to be applied relatively uniformly on the inside surface of the laminate roll. This allows the roll to expand tightly against the mold and to flow into tight, intricate areas of the mold such as the crown area of the fork. The relatively high pressure also tightly compacts the composite fibers, thereby improving the strength of the cured laminate and reducing its weight, by removing excess resin.

For mountain bicycles, a metal brake boss insert is positioned in one of the mold halves (the insert is adhesively bonded and mechanically locked into the composite laminate during the molding process). The dropouts may also be incorporated into the mold at this time, or adhesively bonded at a later step. The mold is closed, pressure applied to the bladder and the composite laminate allowed to cure in an oven.

Step #4, Final Assembly:

Once the laminate is cured in the mold, it is removed from the mold, the air bladder AB is then removed and the laminate prepared for final assembly. The assembly operations involve the bonding of the two fork structure halves together, the installation of the steerer sleeve, the bonding of the "diaper" reinforcement patch and/or the wedge block 25, and the attachment of the dropout lugs 32L and 32R (if not molded in place). Note that the walls of the dropout socket are flared upwardly and tapered in wall thickness, and there is a corresponding taper and thickness taper in the blade. This provides a high strength low weight dropout assembly.

FIG. 5 illustrates the bonding operation for assembling the right and left halves of the fork structure. Not shown in FIG. 5 is the brake stud hole molded in the steerer web (road bicycle design). Once the right and left fork halves are assembled, the steerer sleeve 20 is slipped over the composite steerer substrate and bonded in place. This step is followed by the bonding of the "diaper" patch 23 and/or the wedge block 25.

The final assembly step is the installation of the dropout attachment as shown in FIG. 7. According to the invention, the dropout attachments 32L and 32R are as discussed above, preferably lightweight metal forgings containing a hollow, slightly flared end FE to provide a large bonding surface for the fork blades. The fork blades are bonded inside of the slightly flared ends FE to maximize the strength and stability of the joint.

Manufacturing the invention with formed metal blades follows essentially the same process, except the tubular blades are produced with standard drawing, butting, swaging and forming processes, instead of thermoset molding.

BEARING CONTACT AREA DETAILS:

Impact loads imparted to a bicycle front fork assembly are reacted by the upper and lower head-set bearings. Because of the fork geometry, the lower bearing carries the majority of the reaction loads. Several features of the invention insure the structural integrity of this area of the structure. First, the region in the lower bearing area is provided with the ply geometry defined in Table 1, to give the maximum structural thickness for this area. Second, the ply geometry in Table 1 causes this section of the structure to behave quasi-isotropically (nearly equal structural characteristics in all directions). Third, the steerer is reinforced by the existence of a double thick web (FIG. 11L and 11R—one thickness from the left half structure the second thickness from the right half structure). Fourth, a metal steerer sleeve is provided to resist the direct contact stresses and to mechanically lock together the right and left fork structure halves. Fifth, the diameter of the lower portion of the steerer tube assembly is made larger than standard, in order to increase the strength, bonding surfaces and rigidity of this critical region. Sixth, the larger diameter of the lower section of the steerer tube allows the fork blade material to achieve a much more direct load path into the steerer tube which increases the effectiveness of both composite and metal designs, but especially the composite. Seventh, the incorporation of the lower headset bearing into the head tube eliminates the stack of bearing races traditionally below the head tube, allowing more space to make a smooth gentle transition between the fork blades spaced for tire clearance and the inside of the steerer tube. In composite structures, the smaller the radius of curvature of a section, the higher the delamination forces will be created when it is stressed. While this is not as critical in metal construction, the sharply curved structure will still exhibit higher bending loads under stress. Eighth, the straight fiber reinforcements through the fork crown region combined with the unusual crown geometry provide extra reinforcement to this area.

Included in this invention is a unique concept for the fork-steerer/head-tube connection. FIG. 8 illustrates the concept. This feature involves the steerer 38, steerer sleeve 39, bicycle frame head-tube (HT) and the upper 40 and lower 41 head-set bearings. A tapered geometry is used for the steerer and the head-tube of the frame. This permits the installation of the entire front fork assembly from one direction. This also simplifies the machining of the head tube since it allows the machining of the headtube bearing seats from one direction, thus reducing machine set-up time and assuring precision alignment of the bore.

Figure 1:
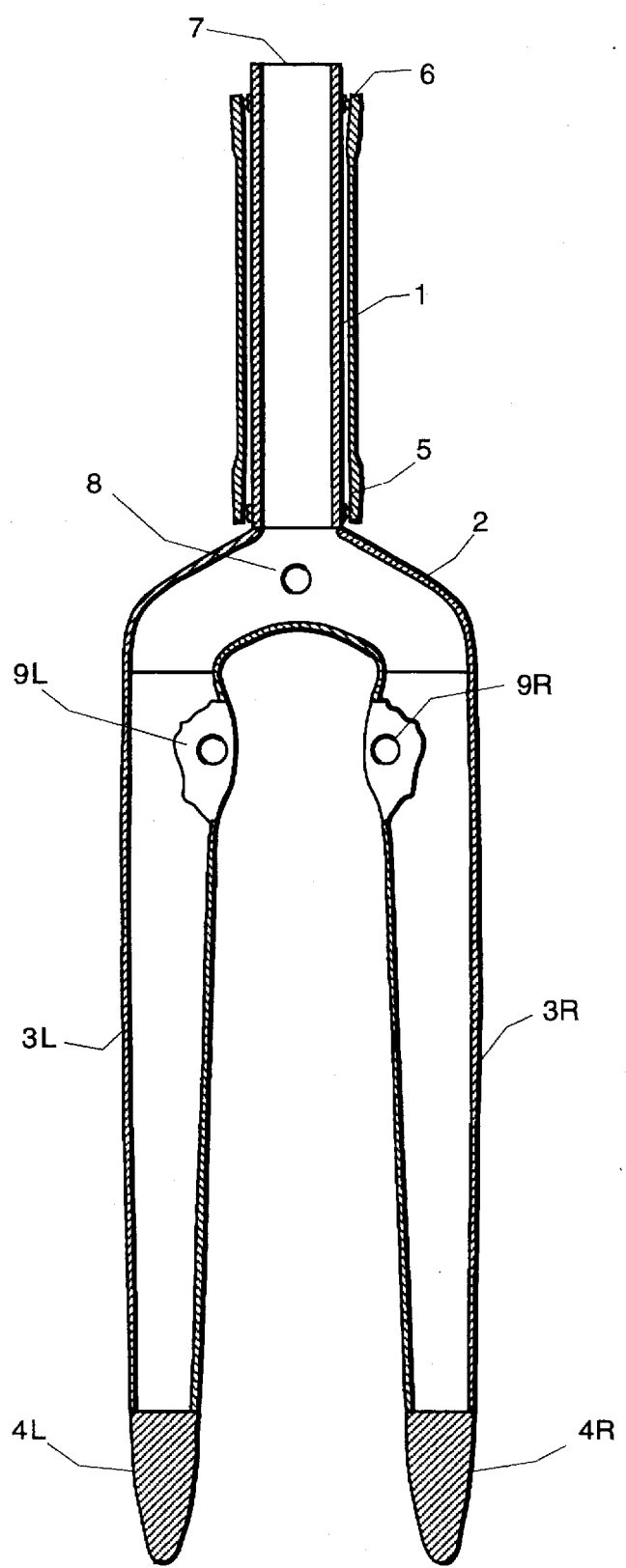
FIG. 1 illustrates a typical prior art fork assembly.
Figure 2A:
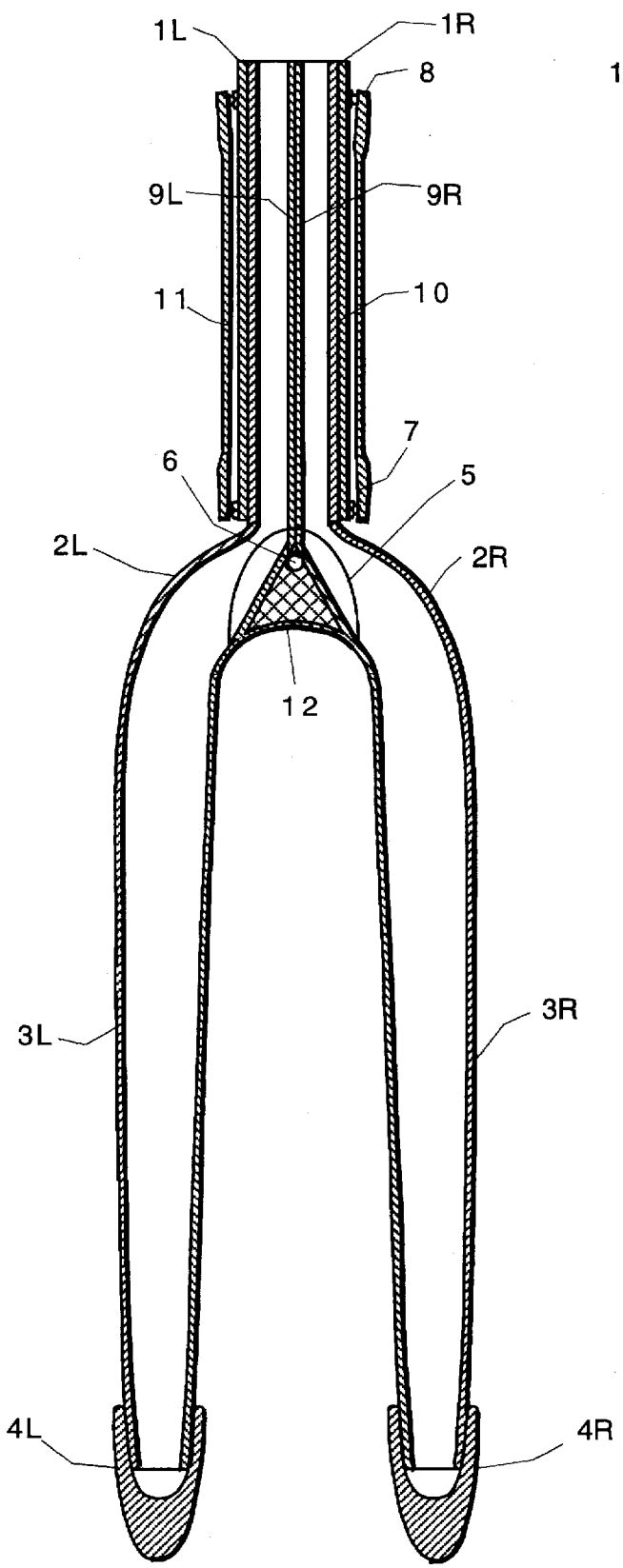
FIG. 2A illustrates an embodiment of the invention for road bicycle.
Figure 2B:
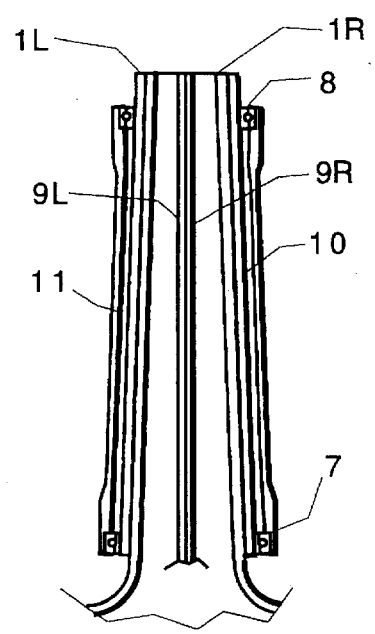
FIG. 2B illustrates an optional modification of the steerer portion.

BRAKE BOSS CONNECTION DETAILS:

The region near a brake caliper support is an area of the structure that can be highly stressed. This area of the structure is also characterized by stress concentrations. This invention provides for a quasi-isotropic laminate geometry for this area. Also, for the road bicycle design (FIG. 2) the brake boss (6) receives support from the local fibers of the lug. Additional support is provided by the metal "diaper patch" which is bonded into place. Alternatively the Brake hole may be reinforced by a formed extension FE of the metal steerer sleeve in the front and rear of the fork shown in FIG. 4B.

The brake caliper support for mountain bicycles is considerably different than the road design. First, mountain bicycles require two supports (FIG. 3), one located on each fork blade (16L and 16R). These supports are comprised of a metal forging insert MFI and a composite substrate formed from the fork blade laminate. The metal forging has a threaded deep drawn portion to accept a brake pivot stud. FIG. 3 shows how the shape of the fork blade is locally deformed to position the brake boss correctly with respect to the tire rim and to blend the fork blade structure with the geometry of the insert. The metal insert is positioned in the mold prior to loading the "cigar" roll laminate. During the molding operation the laminate is forced to flow around the insert, by the air bladder, forming a mechanical lock. The insert is also bonded to the laminate during the curing process.

For both the road and mountain bicycle designs the laminate in the immediate vicinity of the supports is designed to be quasi-isotropic, by arranging a correct mixture of 0-deg, ±45-deg and 90-deg fiber plies.

DROPOUT ATTACHMENT DESIGN:

A lightweight dropout design is used to make the connection between the fork blades and the axle of the front wheel assembly. FIG. 7 illustrates the design which has been briefly described earlier herein. The dropout lug 50 is a metal forging which is substantially hollowed out with tapered walls to reduce weight and increase bond efficiency.

A unique feature of this design is its internal coupling with the fork blades. Most prior art designs usually have solid stem on the dropout that mounts internally in the fork blade tip. The tip of the prior art designs is typically filled with a large amount of potting material to fill the large gaps and achieve an adequate bond. The invention uses a very thin, lightweight adhesive layer to achieve the bond. The structural advantage of the disclosed design, with its external attachment, is that it provides a stronger, more stable joint by maintaining nearly uniform compressive or shear stresses at the bond rather than allowing tension ("peeling") stresses to occur. The external hollow structure provides much larger effective bonding surface and distributes the fork end stresses more evenly than the typical inserted plug type. Also, as the bond surfaces are of larger diameter, the stresses on the bond surfaces are reduced by the increased geometry. The uniform compressive or shear stresses are obtained by the combination of this unique geometry and the matching tapered wall sections through the bond section. All of the above is achieved in addition to a substantial reduction in weight. The metal dropout is lighter. Much less adhesive is used to achieve a superior bond. The fork blade can be designed lighter because it does not experience the high intensity loadings at the tip as in previous designs.

SUPPORTING STRUCTURAL ANALYSIS:

The front fork designs disclosed herein were evaluated using the finite element modeling method. This is a mathematical procedure for evaluating complex structures on a computer. This method is widely used in industry today. The objective of the analysis herein was to, a) evaluate the structural performance of the disclosed fork designs and b)

compare their performance to several leading, prior art fork designs considered to be the nearest competitor.

THE FINITE ELEMENT METHOD:

The FEA method breaks the material continuum of a structure into a finite number of mathematical elements. These elements may be two or three dimensional beams, two or three dimensional, multi-layered plates and shells or three dimensional, multi-layered solids. The deformation characteristics of these elements are defined in terms of their nodal displacements (nodes are the connecting points of the finite elements) and the forces externally applied to these nodes. By defining the material properties, the geometry of the finite element system, the locations and magnitudes of the applied forces and the boundary conditions of the structure, the displacement and stress distribution within the material continuum, at each layer in the laminate, can be calculated.

Both linear and nonlinear modeling can be done with the FEA approach. Non-linearities in the structure include both large deformations and material yielding. The nonlinear solution allows the calculation of the force v.s. displacement (F-D) characteristics of the structure to collapse. This is useful in comparing the overall strength of the structure to other similar product currently on the market. We have obtained the F-D characteristics for various fork designs from actual static tests.

Model Description:

FIGS. 9 and 10 illustrate the model used for evaluating the front fork assembly. The model consists of approximately 3600 elements with close to 18,000 degrees-of-freedom. The model represents half of the fork structure, with appropriate boundary conditions applied to simulate the effects of the other half structure and the reactions at the head-set bearings. A concentrated load of 500 lbf (representing a full impact load of 1000 lbf) was applied to node 11 in the –Z direction. Node 11 is located at the centerline of the front axle, as indicated in FIG. 11.

FEA Results:

The results of the FEA, nonlinear analysis were obtained in terms of the maximum VonMises stress and the force v.s. displacement (F-D) characteristics of the structure. The F-D results of the analysis are summarized in FIG. 12 where they are plotted against other fork designs that were actually tested. The results show that the design covered by this invention is stronger and stiffer than any other competition fork design tested, including our own lightweight aluminum fork (U.S. Pat. No. 5,002,297). The estimated weight for the invention is approximately 300 gms for the road bicycle design and 375 gms for the mountain bicycle design. This is considerably less than comparable forks currently on the market.

In contrast with the prior art, in the present invention, the pressure container is either a flexible bladder, that is removed from the product after molding, or a very thin, lightweight flexible bag that remains inside the product after molding. In either event the dead weight left behind, within the fork structure, is very minimal at most.

Second, the pre-pressurized flexible container (bladder) of the prior art is not regulated during the molding operation. With the invention disclosed herein, the bladder (or lightweight bag) remains connected to the pressure source and the pressure is maintained and/or controlled during the molding process to achieve the ideal level of compaction (hence, maximum strength).

Third, the prior art uses a crutch piece 24, bonded in place, to support the crown area of the fork during loading. The problem is, the crutch piece bond is relatively weak in tension and torsional shear, if not adequately reinforced. In the prior art a single reinforcement piece, a saddle-like crutch sheath is added to protect the crutch piece from the spreading of the fork arms. However, this is not the critical loading of the crutch piece, since the "spreading of the fork blades" is prevented by the front axle attachment. The critical loading for the crutch piece is the twisting of the blades around the axis of the steerer and the rotation of the fork blades around the axis perpendicular to the axis of the steerer. Both of these responses of the fork blades occur in a frontal impact. These responses induce both tension and shear stresses within the crutch piece bond. The "saddle-like crutch sheath", provided in the prior art, is not configured or positioned to resist these induced bond stresses.

The present invention avoids prior art weakness and provides both hoop and longitudinal strips of composite materials (Items 30 and 31, FIG. 4) to counter this action and to improve the ultimate strength of the fork crown. Fourth, the prior art design is constructed by layers of fiber being "laid around" the core material. In the present invention, the fiber lay-up is assembled in a flat pattern (see FIG. 5A) and the entire pattern is rolled up in a "cigar" roll. The pattern could be rolled up around a pre-pressurized bladder or the bladder inserted after the "cigar" roll-up has been created using a tool.

Fifth, the prior art makes use of weaker materials in its construction. A significant part of the structure is made from syntactic and rigid foam materials, which are not noted for their superior strength. These foam materials make up a good percentage of the total structural weight. Not only is the core of the prior art structure made from this material but the first "sheath" is made from this material as well. In the present invention all of the fork blade structure is made from a high strength composite material, with optimally laid fiber orientations. This makes the current invention stronger and lighter than the prior art.

In summary, it is believed that the prior art designs are heavier, weaker, less reliable and more costly to produce than forks as disclosed herein. The superiority of the current invention is due in part to the improved, more efficient, method of construction, the improved method of pressurizing the part during the molding process and the improved fiber alignment and lay-up geometry of the laminate.

Summarizing, the invention provides one or more of the following advantageous features:

Road bike fork approximately ⅔ or less the weight of prior art forks;

Mountain bike fork approximately ⅔ or less the weight of prior art forks;

Road bike forks for adult competition size Metric 571 or larger (24 inches or larger outer tire diameter) (not per se novel);

Mountain bike forks for adult competition 24 inches or larger outer tire diameter (not per se novel);

Flared cup-shaped dropout made from aluminum, magnesium, titanium or beryllium material or alloy;

Flared cup-shaped dropout bonded to a tubular fork blade;

Flared cup-shaped dropout bonded to a tubular composite fork blade;

Low drag airfoil shape fork blades (not per se novel);

Low drag airfoil shape dropouts;

Fork blades with D-section on the upper end, to fit into lower bearing region of fork;

Fork blades bonded directly into tubular steerer tube of fork;

Steerer tube with larger inner diameter lower end and smaller inner diameter upper end;

Head bearing assembly with larger diameter lower bearing and smaller diameter upper bearing, bearings being mounted directly inside the bicycle head tube;

Head tube bearings for road bikes with upper bearing ID of 1.062" and lower bearing ID of 1.312";

Head tube bearings for off-road bikes with upper bearing ID of 1.3125" and lower bearing ID of 1.5625";

Fork blades with gentle double curve to clear tire and fit directly up into steerer tube;

Fork blades with higher modulus fibers in the 90 degree direction to the blade axis and lower modulus fibers in the 0 degree direction;

Fork blades made with hard exterior molds and inflatable inner bladder (not per se novel);

Fork where the fork blades come together in an inverted V-shape;

A diaper/wedge assembly to co-cure with or bond into the underside of where the traditional fork crown would be, including provision for mounting a brake caliper, including metal or composite plies extending onto the surfaces of the blades in order to reinforce and stiffen those areas;

Fork blade with a section of essentially straight high strength fibers placed on the leading and trailing edges of the fork blade passing from the fork blade through the crown region and inside of the lower head bearing assembly;

Composite fork blade including one or more layers of plus or minus 25 to 65 degree fibers (not per se novel);

Composite fork blade lay-up consisting of stacked layers of unidirectional fiber in alternating ply angles, rolled up into a preform, and placed into a mold over an inflatable flexible bladder;

Steerer tube with upward extension above the upper head bearing to which the handlebar extension may be attached to the outside diameter (not per se novel);

Tapered head tube with larger diameter bearing inserted directly into the lower end and smaller diameter bearing inserted directly into the upper end;

Steerer tube without threads (see Klein U.S. Pat. No. 5,002,297);

Tubular dropouts where the composite fork blade is molded and bonded integrally into said dropouts;

Fork blades made individually and subsequently joined together into the steerer tube;

Composite fork blades where one fork blade is molded individually and the second blade is co-molded and bonded to the first in the second operation;

Front fork where both the upper and lower bearing races are precision machined on the steerer tube after the forming and assembly of the fork;

A cantilever brake mounting boss co-molded and bonded into the fork blade, fiber layers adhered, consolidated and supported by the internal inflatable bladder;

A much higher strength road competition fork, able to withstand a frontal cantilever bending load supported by the head bearings applied 90 degrees to the fork axis at the center of the from dropouts with a front hub installed of 900 lbs force with a weight of less than 300 grams;

A much higher strength off-road competition fork, able to withstand a frontal cantilever bending load as described above of 900 lbs force with a mass of less than 375 grams.

While preferred embodiments of the invention have been shown and described, it will be appreciated that various modifications and adaptations of the invention will be apparent to those skilled in the art.

What is claimed is:

1. In a lightweight composite bicycle front fork assembly for receiving front wheel and axle of a bicycle, comprising: a steerer having a contact area for upper and lower head set bearings, respectively, a pair of blades having upper ends and distal ends, a crown joining said pair of blades to said steerer at their respective upper ends, and dropout means at the respective distal ends of said blades for receiving said axle, and one or more brake pivot mounting, said steerer, crown and blades being comprised of a composite laminate lay-up, including primary load carrying fibers, the improvement wherein areas of said front fork assembly where abrupt changes in the direction of load paths occur, including said contact area, crown, brake pivot mounting, and drop-out means, said load carrying fibers are directly aligned with the load and the remaining fibers are incorporated to control structural deformation and maintain said primary load carrying fibers in position and prevent them from buckling and delaminating, said fork assembly having left and right hand halves which are substantially mirror images of each other, each half comprising:
a shaped tubular body, said shaped tubular body having an upper steerer tube end, a crown portion, blade portion, and a lower drop-out end,
said upper steerer tube end having an outer semi-circular surface and an inner abuttable surface, and
means joining said inner abuttable surfaces of said left and right hand halves in abutting relation to form a center bifurcation in the said fork assembly.

2. The lightweight bicycle front fork assembly as defined in claim 1 wherein said steerer tube end tapers from a larger diameter adjacent to said crown portion to a smaller diameter at said distal end.

3. The lightweight bicycle front fork assembly as defined in claim 1 wherein said means joining includes a cylindrical metal tube telescoped over said semicircular surfaces.

4. The lightweight bicycle front fork assembly as defined in claim 1 wherein said means joining includes adhesive between said inner abuttable surfaces.

5. The lightweight bicycle front fork assembly as defined in claim 1 wherein said abuttable surfaces are substantially planar.

6. The lightweight bicycle front fork assembly as defined in claim 1 wherein said inner abuttable surfaces include one or more large congruent, surface areas.

7. The lightweight bicycle front fork assembly as defined in claim 1 including a diaper, reinforcement patch fiber, in a resin/matrix bridging said crown portions of said left and right hand halves and adhered thereto.

8. The lightweight bicycle front fork assembly as defined in claim 1 including a wedge member and congruent facing surfaces on said crown portions, respectively, and adhesive between said congruent facing surfaces.

9. The lightweight bicycle front fork assembly as defined in claim 1 including a pair of drop-out lugs, each said drop-out lug having cup-shaped members for receiving the lower drop-out ends of said blade portions, respectively.

10. The lightweight bicycle front fork assembly as defined in claim 1 including one or more threaded metal brake stud pivot mounting inserts.

11. The lightweight bicycle front fork assembly as defined in claim 1 in which said steerer end is "D"-shaped, having a flat web, to form a bonding surface for joining said two shaped tubular bodies and to provide additional structural support in reacting to bearing loads.

12. The lightweight bicycle front fork assembly as defined in claim 11 including a metal steerer sleeve telescoped over said "D" shaped steerer ends and bonded into place to form a hard surface for: a) reacting the bearing contact stresses and b) distributing the bearing loads in said front fork assembly.

13. The lightweight bicycle front fork assembly as defined in claim 12 wherein said metal steerer sleeve has a steerer sleeve surface and a bearing raceway seat formed in said steerer sleeve surface in a matching position to the lower head-set bearing.

14. The lightweight bicycle front fork assembly as defined in claim 12 wherein the metal steerer sleeve contains a bearing raceway seat in the surface of the said steerer sleeve in a matching position to the upper head-set bearing.

15. The lightweight bicycle front fork assembly as defined in claim 12 including a tapered metal steerer sleeve that telescopes over said "D" shaped steerer and is bonded into place to form a hard surface for: a) reacting the bearing contact stresses and b) distributing the bearing loads to the composite.

16. The lightweight bicycle front fork assembly defined in claim 1, said blade portions having an outside surface, said front fork assembly including metal dropout lugs adhesively bonded to said outside surface of the drop-out ends of said blade portions to form a strong, stable joint.

17. The lightweight bicycle front fork defined in claim 1 in which said crown portion includes a pair of joined web members and in which a brake stud pivot mounting insert is molded into said web members to accommodate a brake stud.

18. The lightweight bicycle front fork assembly defined in claim 1 in which said brake pivot mounting is bonded in place with a metal "diaper" reinforcement patch and a composite wedge block, for additional structural support.

19. The lightweight bicycle front fork assembly defined in claim 1 including a metal "diaper" patch and a composite wedge block is to reinforce the fork crown.

20. The lightweight bicycle front fork assembly defined in claim 1 wherein each blade has an upper end solid section of predetermined, aerodynamic shape which tapers to said dropout means.

21. The lightweight bicycle front fork assembly defined in claim 20 wherein the blades are hollow tubing.

22. The lightweight bicycle front fork assembly defined in claim 1 wherein said dropout means have a lower member for receiving a front wheel axle and an upper curved securement portion, the lower ends of said blades being curved complementary and bonded thereto, and a positioning lip formed on said upper curved securement portion.

23. The lightweight bicycle front fork assembly defined in claim 1 wherein said crown has an aerodynamic shape.

24. A lightweight bicycle composite front fork assembly, said composite front fork assembly having left and right hand halves which are substantially mirror images of each other, each half comprising:

a shaped tubular body, said shaped tubular body having an upper steerer tube end, a crown portion, blade portion, and a lower drop-out end, said upper steerer tube end having an outer semi-circular surface and an inner abuttable surface, and means joining said inner abuttable surfaces of said left and right hand halves in abutting relation, said dropout ends having outside surfaces, and including metal dropout lugs, adhesively bonded to the outside surface of said drop-out ends of said blades to form a strong, stable joint.

25. A lightweight bicycle composite front fork assembly, said composite front fork assembly having left and right hand halves which are substantially mirror images of each other, each half comprising:

a shaped tubular body, said shaped tubular body having an upper steerer tube end, a crown portion, blade portion, and a lower drop-out end, said upper steerer tube end having an outer semi-circular surface and an inner abuttable surface, and means joining said inner abuttable surfaces of said left and right hand halves in abutting relation including a metal "diaper" patch and a composite wedge block is used to reinforce the fork crown.

26. A lightweight bicycle composite front fork assembly, said composite front fork assembly having left and right hand halves which are substantially mirror images of each other, each half comprising:

a shaped tubular body, said shaped tubular body having an upper steerer tube end, a crown portion, blade portion, and a lower drop-out end, said upper steerer tube end having an outer semi-circular surface and an inner abuttable surface, and means joining said inner abuttable surfaces of said left and right hand halves in abutting relation including a dropout in each said lower dropout end portion and wherein each said dropout has a lower member for receiving a front wheel axle and an upper curved securement portion, each said lower end portion of said blade portions being curved complementary and bonded thereto, and a positioning lip formed on said upper curved securement portion.

27. A lightweight bicycle composite front fork assembly, said composite front fork assembly having left and right hand halves which are substantially mirror images of each other, each half comprising:

a shaped tubular body, said shaped tubular body having an upper steerer tube end, a crown portion, blade portion, and a lower drop-out end, said upper steerer tube end having an outer semi-circular surface and an inner abuttable surface, and means joining said inner abuttable surfaces of said left and right hand halves in abutting relation including a cylindrical metal tube telescoped over said outer semi-circular surfaces.

28. The lightweight bicycle front fork assembly as defined in claim 27 wherein said steerer tube end has a distal end and tapers from a larger diameter adjacent to said crown portion to a smaller diameter at the distal end thereof.

29. The lightweight bicycle front fork assembly as defined in claim 27 wherein said means joining includes adhesive between said inner abuttable surfaces.

30. The lightweight bicycle front fork assembly as defined in claim 27 wherein said inner abuttable surfaces are substantially planar.

31. The lightweight bicycle front fork assembly as defined in claim 27 wherein said inner abuttable surfaces include one or more large congruent, surface areas.

32. The lightweight bicycle front fork assembly as defined in claim 27 including a diaper shaped reinforcement patch fiber, in a resin/matrix bridging said crown portions of said left and right hand halves and adhered to said left and right hand halves.

33. The lightweight bicycle front fork assembly as defined in claim 27 including a wedge member and congruent facing surfaces on said crown portions, respectively, and adhesive between said congruent facing surfaces.

34. The lightweight bicycle front fork assembly as defined in claim 27 including a pair of drop-out lugs, each said drop-out lug having cup-shaped members for receiving the lower drop-out ends of said blade portions, respectively.

35. The lightweight bicycle front fork assembly as defined in claim 27 in which each said steerer tube end is "D"-shaped, having a flat web forming said abuttable surface and form a bonding surface for joining said "D" shaped ends to each other and to provide additional structural support in reacting to bearing loads.

36. The lightweight bicycle front fork defined in claim 35 in which a brake stud pivot is molded into said webs to accommodate a brake stud.

37. The lightweight bicycle front fork assembly as defined in claim 35 including a metal steerer sleeve telescoped over said "D" shaped steerer ends and bonded into place to form a hard surface for: a) reacting the bearing contact stresses and b) distributing the bearing loads to the steerer ends.

38. The lightweight bicycle front fork assembly as defined in claim 37 wherein said metal steerer sleeve has surfaces and a bearing raceway seat formed in said surfaces.

39. The lightweight bicycle front fork assembly as defined in claim 38 wherein the metal steerer sleeve has an upper headset bearing raceway seat formed in said surfaces.

40. The lightweight bicycle front fork assembly as defined in claim 37 including a tapered metal steerer sleeve telescoped over said "D" shaped steerer ends and is bonded into place to form a hard surface for: a) reacting the bearing contact stresses and b) distributing the bearing loads to said upper steerer tube end.

* * * * *